US008912086B2

(12) United States Patent
Jo et al.

(10) Patent No.: US 8,912,086 B2
(45) Date of Patent: Dec. 16, 2014

(54) METHOD FOR MANUFACTURING TRANSPARENT ELECTRODE USING PRINT-BASED METAL WIRE AND TRANSPARENT ELECTRODE MANUFACTURED THEREBY

(75) Inventors: Jeong-Dai Jo, Daejeon (KR); Jong-Su Yu, Daejeon (KR); Jung Su Kim, Busan (KR); Seong-Man Yoon, Chungcheongnam-do (KR); Sung Woo Bae, Daejeon (KR); Dong-Soo Kim, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 425 days.

(21) Appl. No.: 13/223,402

(22) Filed: Sep. 1, 2011

(65) Prior Publication Data

US 2012/0097424 A1 Apr. 26, 2012

(30) Foreign Application Priority Data

Oct. 26, 2010 (KR) ........................ 10-2010-0104830

(51) Int. Cl.
*H01L 21/44* (2006.01)
*H05K 9/00* (2006.01)
*G02F 1/1343* (2006.01)

(52) U.S. Cl.
CPC ...... *G02F 1/13439* (2013.01); *G02F 2202/022* (2013.01); *G02F 2202/16* (2013.01)
USPC .......................................... 438/609; 174/389

(58) Field of Classification Search
CPC .................................................. G02F 1/13439
USPC .......................... 438/608, 679, 609; 174/389
See application file for complete search history.

(56) References Cited

U.S. PATENT DOCUMENTS 7,968,804 B2 * 6/2011 Frey et al. ..................... 174/392
8,440,496 B2 * 5/2013 Irvin et al. ...................... 438/82

FOREIGN PATENT DOCUMENTS

| | | |
|---|---|---|
| JP | 1993-303995 | 11/1993 |
| JP | 09-147639 | 6/1997 |
| JP | 2002-343150 | 11/2002 |
| JP | 2009-146747 | 7/2009 |
| JP | 2009-252493 | 10/2009 |
| JP | 2010-108684 | 5/2010 |
| KR | 10-1996-0026196 | 7/1996 |

OTHER PUBLICATIONS

Jong-Su Yu, et al., Study and Fabrication of Transparent Electrode Film by using Thermal-Roll Imprinted Ag Mesh Pattern and Coated Conductive Polymer, Journal of the Korean Society for Precision Engineering, Sep. 2010, pp. 11-15, vol. 27, No. 9, Korea.

* cited by examiner

*Primary Examiner* — William D Coleman
(74) *Attorney, Agent, or Firm* — Lexyoume IP Meister, PLLC

(57) ABSTRACT

A method for manufacturing a transparent electrode using a print-based metal wire is provided, which enables the mass production of the transparent electrode as a substitute for ITO at low cost. The manufacturing method includes: the first step of forming a metal wire in a pattern set for a transparent substrate; and the second step of coating a solution type transparent electrode on the transparent substrate.

10 Claims, 10 Drawing Sheets

METHOD FOR MANUFACTURING TRANSPARENT ELECTRODE USING PRINT-BASED METAL WIRE AND TRANSPARENT ELECTRODE MANUFACTURED THEREBY

CROSS-REFERENCE TO RELATED APPLICATION

This application claims priority to and the benefit of Korean Patent Application No. 10-2010-0104830 filed in the Korean Intellectual Property Office on Oct. 26, 2010, the entire contents of which are incorporated herein by reference.

BACKGROUND OF THE INVENTION (a) Field of the Invention

The present invention relates to a method for manufacturing a transparent electrode using a print-based metal wire, which enables the mass production of the transparent electrode at low cost, and a transparent electrode manufactured thereby.

(b) Description of the Related Art

In general, a transparent electrode is a functional thin film electrode that allows light in a visible light region to pass through and has given electrical conductivity. For example, transparent electrodes are used in flat panel displays such as liquid crystal displays (LCDs), plasma display panels (PDPs), organic light emitting displays (OLEDs), and field emission displays (FEDs), touch panels, transparent electromagnetic wave shielding films, transparent electrostatic protective films, planar antennas for communication devices, heat reflective coatings, and solar cells.

The transparent electrodes has two properties: high electrical conductivity with a specific resistance of less than $1\times10^{-3}$ Ω/sq and a surface resistance of less than $10^3$ Ω/sq; and a transmittance of more than 80% in a visible light region of 380 to 780 nm. Accordingly, conductive material used for the transparent electrodes include metals, metal oxides, conductive polymers, carbon materials and the like.

Indium tin oxide (ITO), an example of metal oxide conductive material, is widely used because of high transmittance and low electrical resistance. However, indium which is a main material of ITO is very expensive and requires expensive vacuum deposition equipment in the manufacturing process of an ITO thin film the main raw material of ITO is indium, which is expensive.

Moreover, a transparent electrode formed by coating ITO on a plastic film is easily shattered even under a small external impact or stress, shows low mechanical stability when the plastic film is bent or folded, and undergoes changes in electrical characteristics due to thermal deformation caused by the difference in thermal expansion coefficient with the film.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for manufacturing a transparent electrode using a print-based metal wire, which enables the mass production of the transparent electrode as a substitute for ITO at low cost. Further, the present invention provides a transparent electrode manufactured by the method for manufacturing a transparent electrode using a print-based metal wire.

An exemplary embodiment of the present invention provides a method for manufacturing a transparent electrode using a print-based metal wire, the method including: forming a metal wire in a pattern set for a transparent substrate; and coating a solution type transparent electrode on the transparent substrate.

In the forming the metal wire, the pattern may be formed by using a synthetic resin film as the transparent substrate.

The forming the metal wire may include: forming concave grooves of the pattern in the synthetic resin film; and forming the metal wire by filling a metal paste in the concave grooves of the pattern.

In the forming concave grooves, the concave grooves of the pattern may be formed on the synthetic resin film by any one of the following: thermal roll imprinting, hot embossing, nanoimprint lithography (NIL), and thermal imprinting.

In the forming the metal wire by filling the metal paste, the metal paste may be filled in the concave grooves by any one of the following: doctor blading, self-assembly using surface energy, and electroforming.

In the forming the metal wire by filling the metal paste, the solution type transparent electrode may be coated on the synthetic resin film by any one of the following: spin coating, slot die, ESD, spray, and micro gravure.

In the forming the metal wire, the pattern may be formed by using glass or a synthetic resin film as the transparent substrate.

In the forming the metal wire, a raised thin film of metal paste having the pattern may be formed on the transparent substrate.

In the forming the metal wire, the raised thin film having the pattern may be formed on the transparent substrate by any one of the following: a gravure printing method, an offset printing method, an inkjet printing method, a micro contact printing method, a flexo printing method, and a screen printing method.

In the coating the solution type transparent electrode, the solution type transparent electrode may be coated on the transparent substrate by any one of the following: spin coating, slot die, ESD, spray, and micro gravure.

A transparent electrode according to an exemplary embodiment of the present invention is manufactured by the method for manufacturing a transparent electrode using a print-based metal wire.

The metal wire may be formed of any one of metals such as Ag, Cu, and Al used as an organic paste.

The solution type transparent electrode may be formed of at least one of the following: conductive polymer, carbon nano tube (CNT), graphene, and solution type metal.

The metal wire may be formed in any one of the following: circular, triangular, hexagonal, crosshatched, and crossed shapes.

The metal wire may have a micro-scale line width and interval, and may have a nano-scale line width and interval depending on a stamp molding technique.

The concave grooves having the pattern may have a rectangular, triangular, or arc-shape on a cross-section cut vertically through the transparent film.

According to an exemplary embodiment of the present invention, a metal wire is formed in a predetermined pattern on a transparent substrate, and a solution type transparent electrode is coated on the transparent substrate, thereby offering high electrical conductivity caused by the metal wire and high transmittance caused by the solution type transparent electrode and the transparent film, i.e., mass-producing transparent electrodes, which are cheap and can replace ITO.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
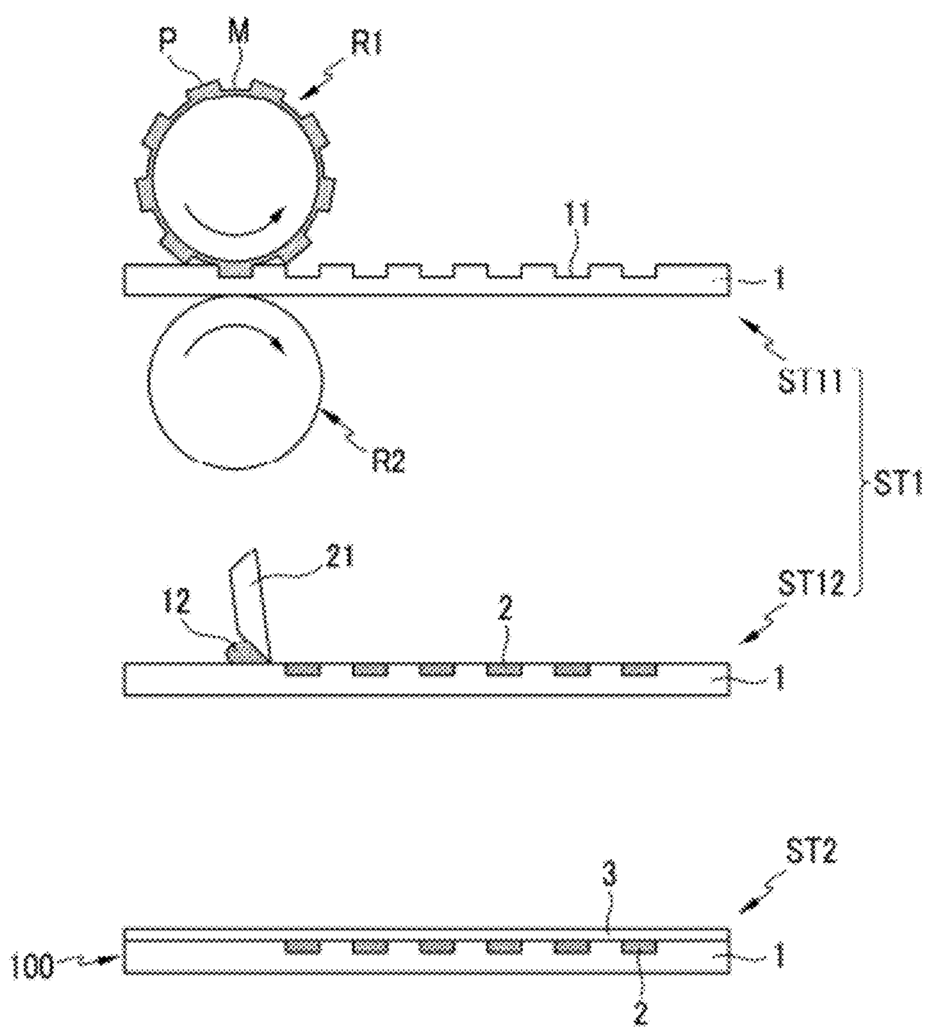
FIG. 1 is a sequential chart showing a method for manufacturing a transparent electrode using a print-based metal wire according to a first exemplary embodiment of the present invention.

FIG. 1 is a sequential chart showing a method for manufacturing a transparent electrode 100 using a print-based metal wire according to a first exemplary embodiment of the present invention. To avoid redundant explanation, the method for manufacturing a transparent electrode 100 will be described together with the structure of the transparent electrode 100 manufactured by the manufacturing method.

Referring to FIG. 1, the method for manufacturing a transparent electrode 100 according to a first exemplary embodiment includes: the first step ST1 of forming a metal wire 2 in a pattern set for a transparent substrate 1; and the second step ST2 of coating a solution type transparent electrode 3 on the transparent substrate 1 so as to cover the metal wire 2.

In the first exemplary embodiment, the transparent substrate 1 may be formed of a synthetic resin film, such as a thermally deformable polyethylene terephthalate (PET) film, a polyethylene naphthalene (PEN) film, a polyethersulfone (PES) film, or a polyvinyl chloride (PC) film. In the first step ST1, a pattern for the metal wire 2 is formed on a synthetic resin film. For example, the first step ST1 includes the first sub-step ST11 of forming concave grooves 11 of the pattern in the synthetic resin film and the second sub-step ST12 of forming the metal wire 2 by filling a metal paste 12 in the concave grooves 11 of the pattern.

For example, in the first sub-step ST11, the concave grooves 11 of the pattern set for the transparent substrate 1 may be formed by thermal roll imprinting, hot embossing, NIL, or thermal imprinting. For convenience of explanation, FIG. 1 illustrates the configuration of forming the concave grooves 11 on the transparent substrate 1 by a thermal roll imprinting method.

In the thermal roll imprinting method, as a thermally deformable transparent substrate 1 is supplied between a heating roll R1 mounted with an imprinting stamp S with an original pattern P to be imprinted on the transparent substrate 1 and a sub roll R2, the pattern P of the imprinting stamp S is imprinted on the transparent substrate 1 to thus form the concave grooves 11 on the transparent substrate 1.

In the thermal roll imprinting method, the original pattern P of the imprinting stamp S can be formed in various manners, and therefore the concave grooves 11 on the transparent substrate 1 can be easily formed in various patterns. Moreover, the concave grooves 11 can be formed in a rectangular shape on a cross-section cut vertically through the transparent substrate 1.

For example, in second sub-step ST12, the metal paste 12 can be filled in the concave grooves 11 by doctor blading, self-assembly using surface energy, or electroforming. For convenience of explanation, FIG. 1 illustrates the configuration of forming the metal wire 2 by filling the metal paste 12 in the concave grooves 11 by the doctor blading method.

In the doctor blading method, the metal paste 12 can be filled in the concave grooves 11 by dispensing the metal paste 12, e.g., an Ag paste, on the transparent substrate 1, and moving the doctor blade 21 or the transparent substrate 1. The metal paste 12 forming the metal wire 2 may be formed from a Cu or Al paste which is cheaper than Ag.

The metal wire 2 formed from the metal paste 12 filled in the concave grooves 11 has the same height as the surface of the transparent substrate 1, so that one side of the transparent substrate 1 is planar on the side of the concave grooves 11.

For example, in the second step ST2, the solution type transparent electrode 3 may be coated by spin coating, slot die, ESD, spray, or micro gravure. The solution type transparent electrode 3 is applied with the same thickness on the surface of the transparent substrate 1 and the surface of the metal wire 2, both of which form a plane.

Accordingly, one surface (bottom surface of FIG. 1) of the transparent electrode 100 is formed to be planar with the transparent substrate 1, and another surface (top surface of FIG. 1) thereof is formed to be planar with the solution type transparent electrode 3. Thus, the transparent electrode 100 can be used as a secondary material forming an electrode in an LCD, a PDP, etc. The solution type electrode 3 can be formed of conductive polymer, CNT, graphene, or solution type metal.

For a thin film having a constant height, ITO has an electrical resistance of 20 Ω/sq, and conductive polymer has an electrical resistance of 100 Ω/sq. On the other hand, in the first exemplary embodiment, the metal wire 2 is formed from an Ag paste, and the transparent electrode 100 covered with conductive polymer has an electrical resistance of 10 Ω/sq. That is, the transparent electrode 100 of the first exemplary embodiment can substitute for a transparent electrode formed of ITO because the overall electrical resistance is reduced with the use of the metal wire 2 formed from the Ag paste and a high transmittance results from the conductive polymer and the transparent substrate 1.

Of the transparent electrode 100, the metal wire 2 may have various patterns, for example, a mesh pattern, and has a predetermined line width W and a predetermined inter-wire interval L.

Figure 2:
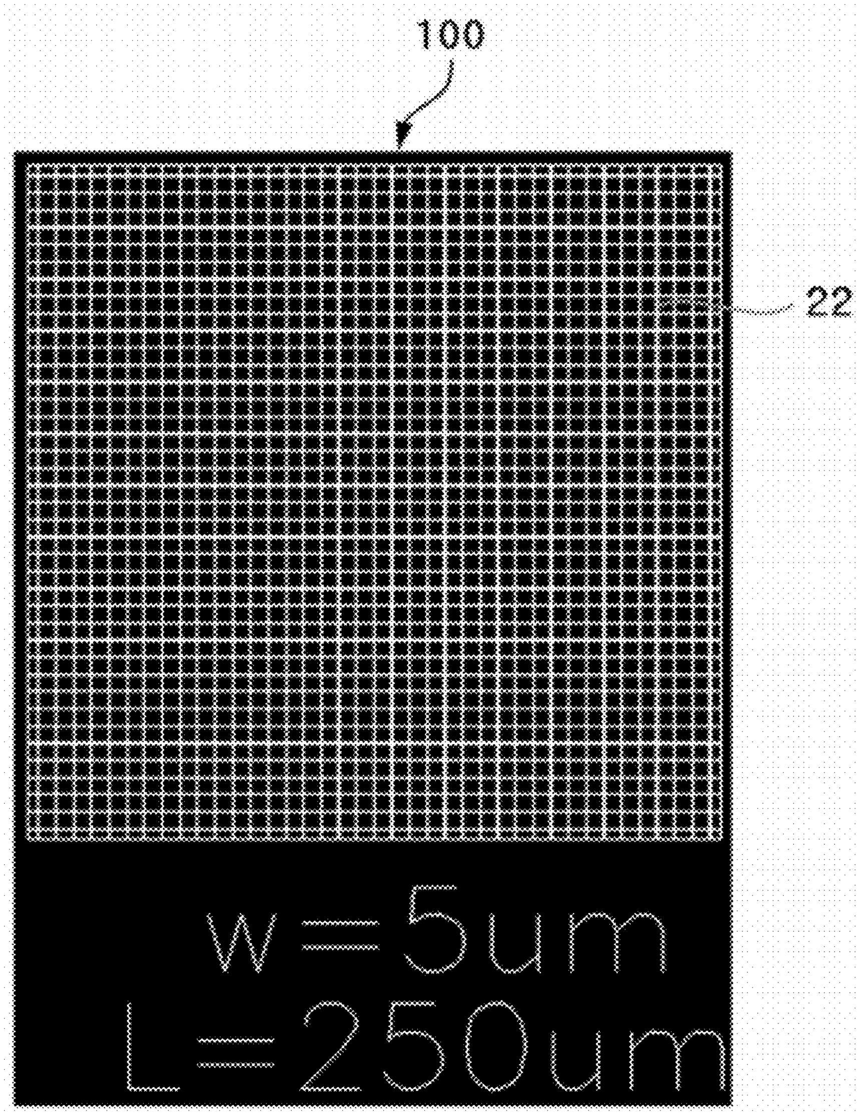
FIG. 2 shows a pattern of the transparent electrode manufactured by the manufacturing method of FIG. 1 according to the first exemplary embodiment.

FIG. 2 shows a pattern of the transparent electrode 100 manufactured by the manufacturing method of FIG. 1 according to the first exemplary embodiment. Referring to FIG. 2, the line width W of the metal wire 2 of the transparent electrode 100 is 5 μm, and an interval L between neighboring metal wires 2 is 250 μm.

Figure 3:
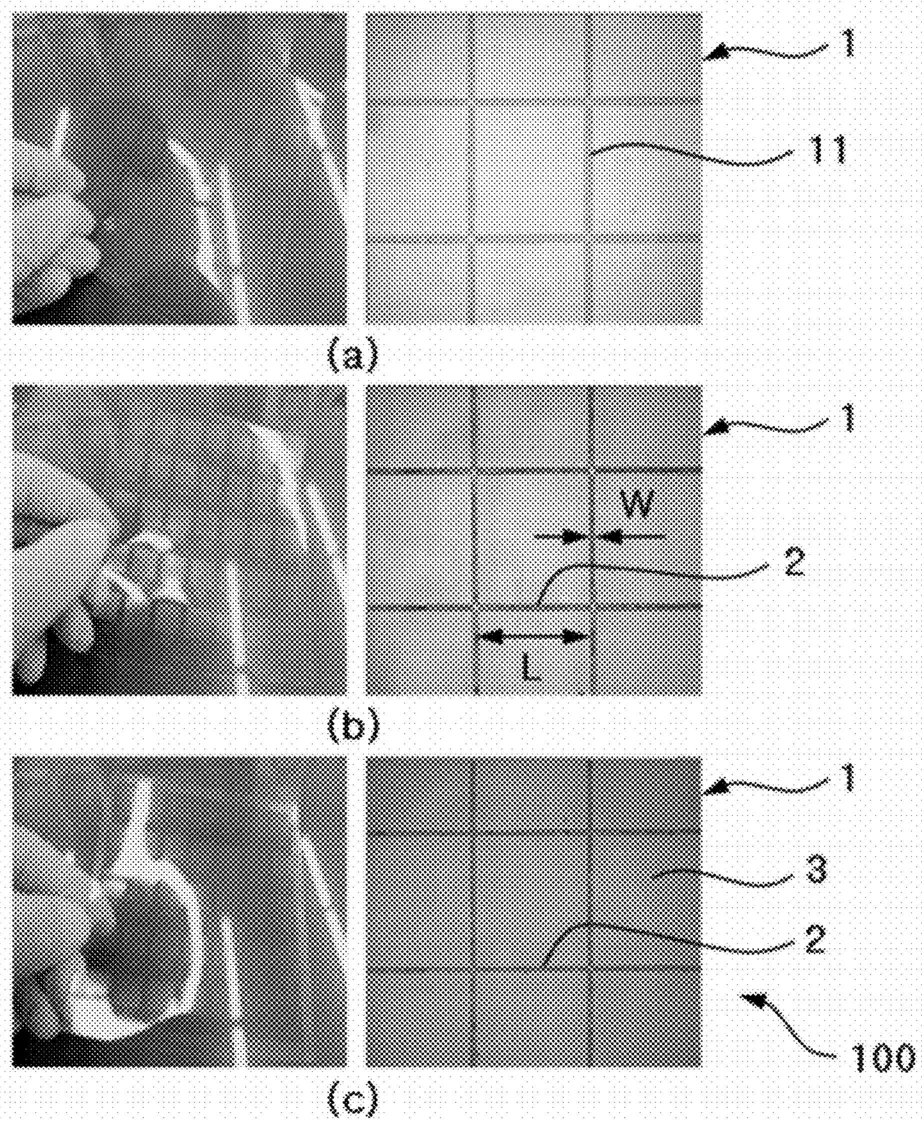
FIG. 3 shows enlarged photographs of a process for manufacturing a transparent electrode by the manufacturing method of FIG. 1 and each process step.
Figure 4:
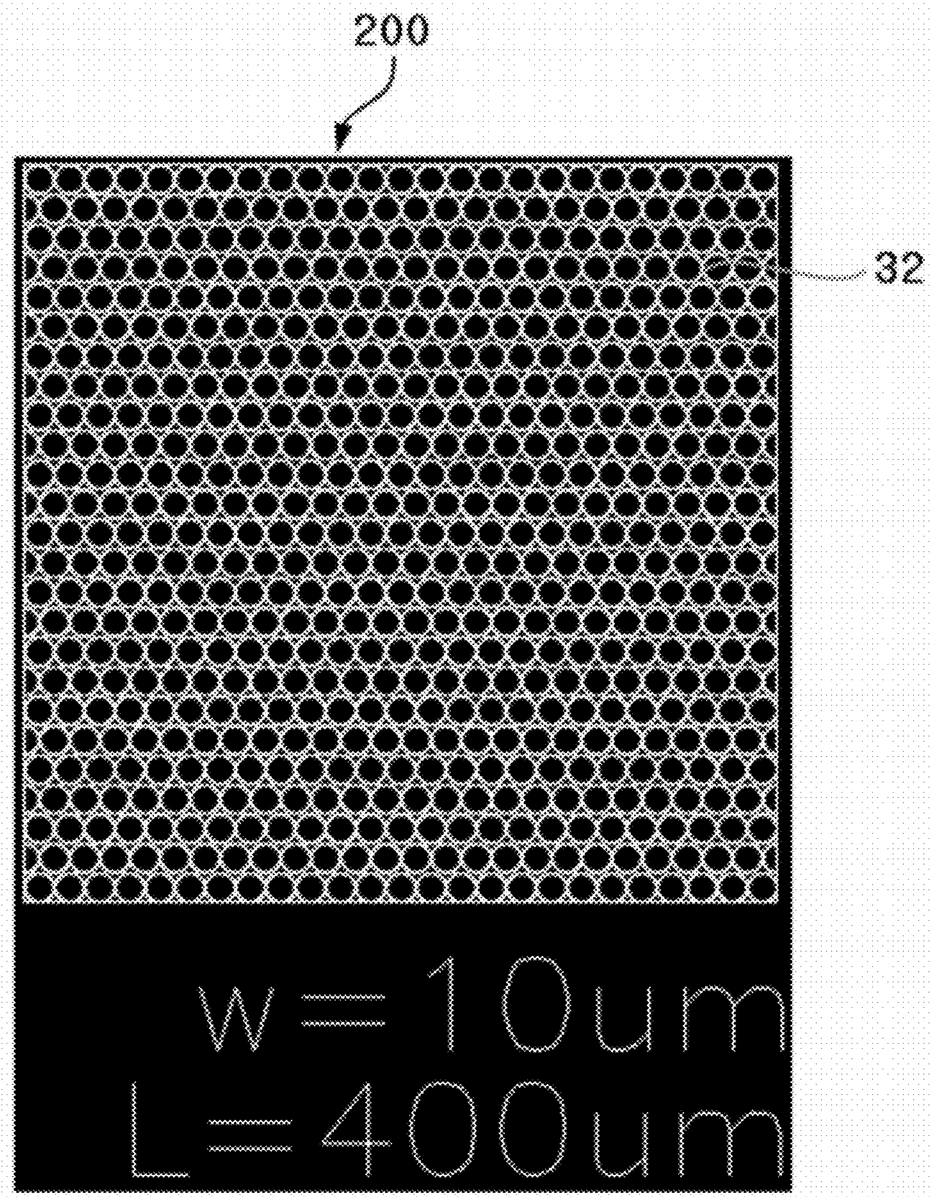
FIG. 4 to FIG. 8 show patterns of transparent electrodes according to second to sixth exemplary embodiments manufactured by manufacturing methods of the second to sixth exemplary embodiments of the present invention.
Figure 5:
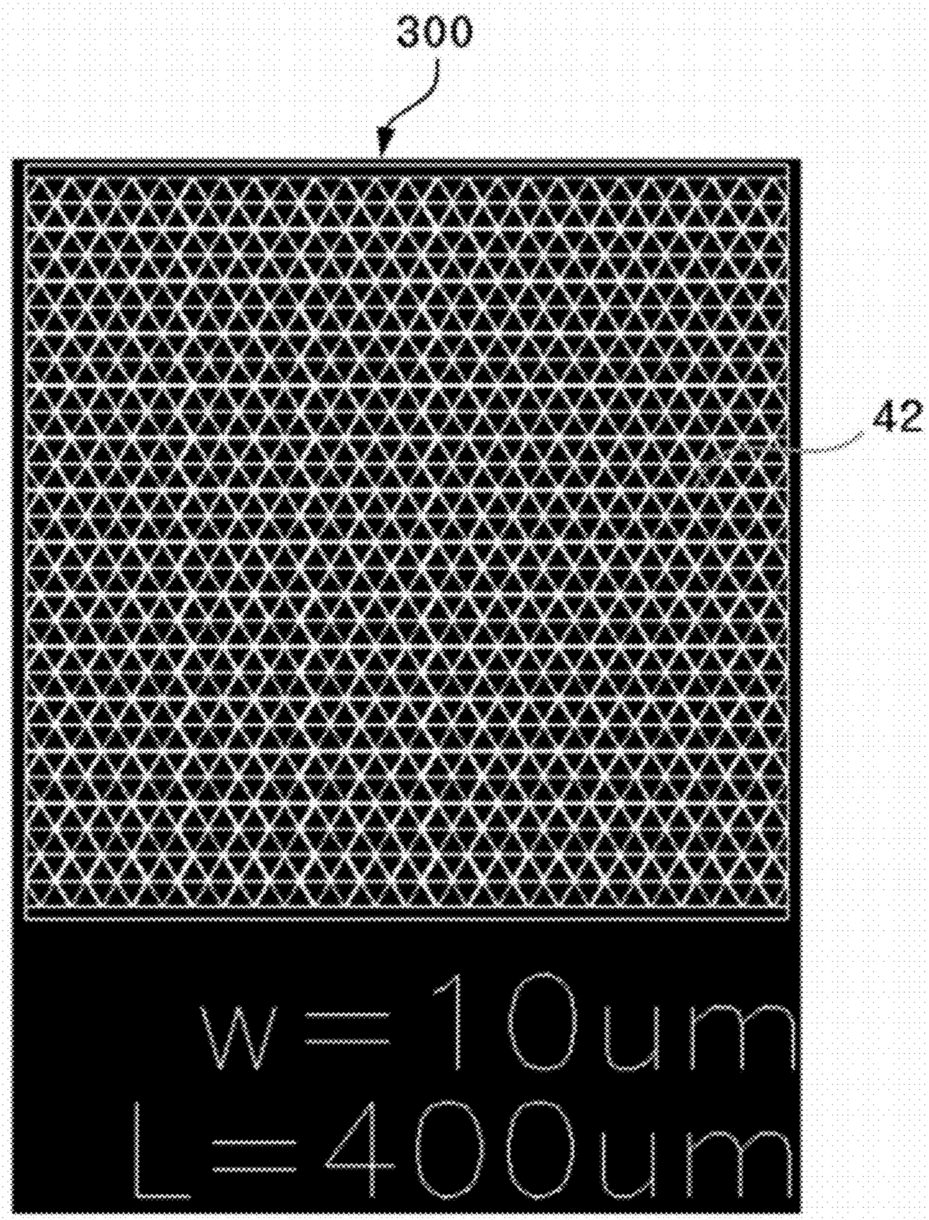
Figure 6:
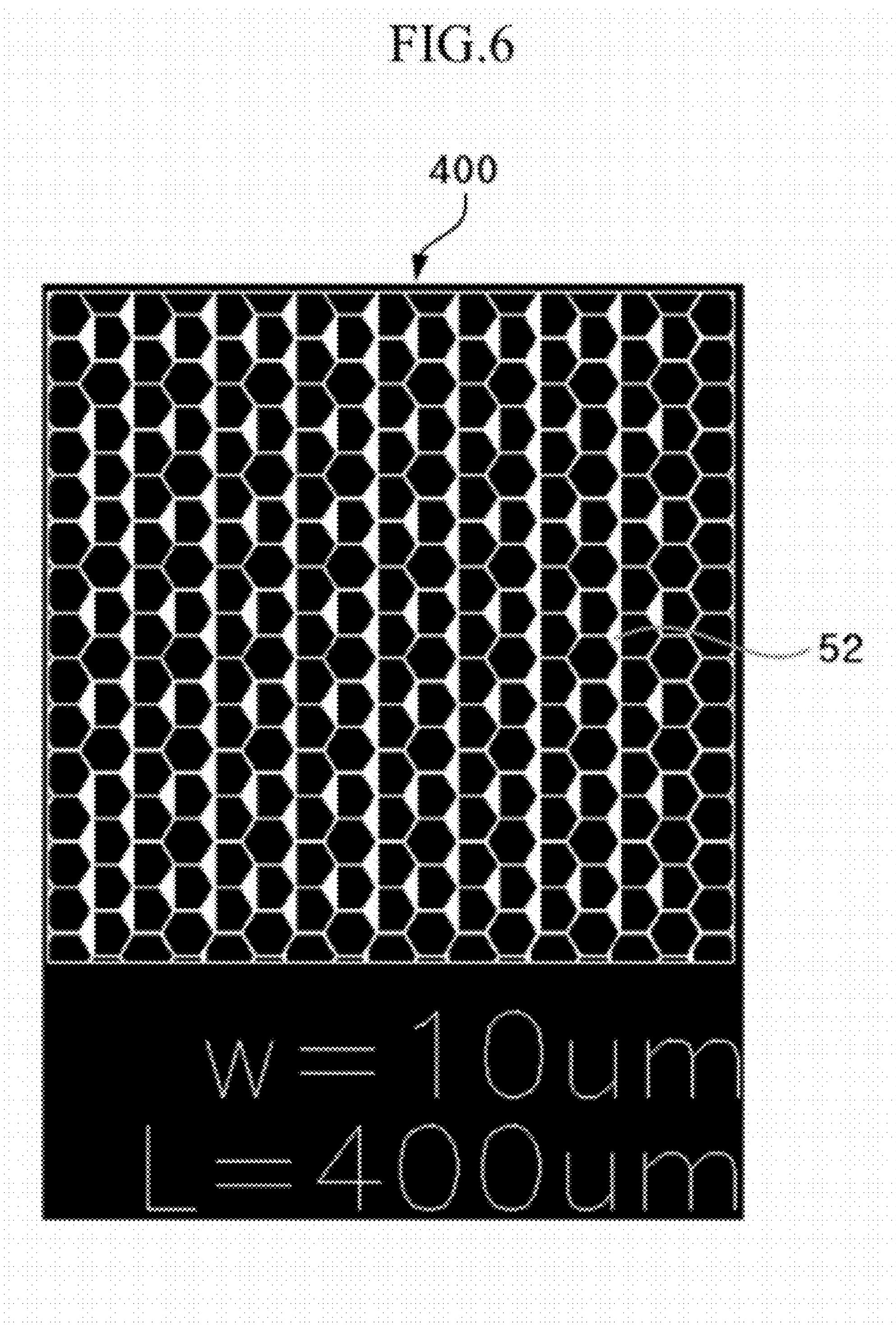
Figure 7:
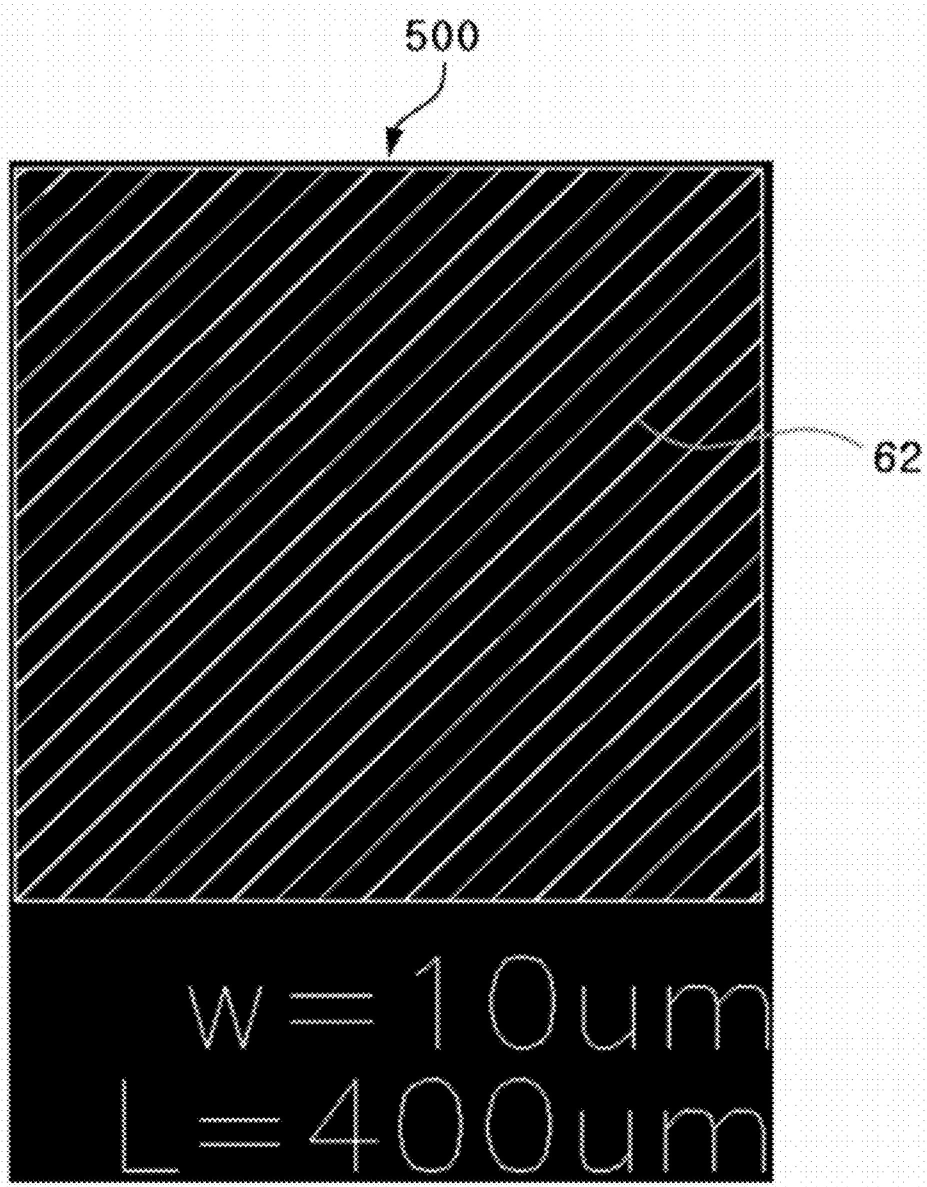
Figure 8:
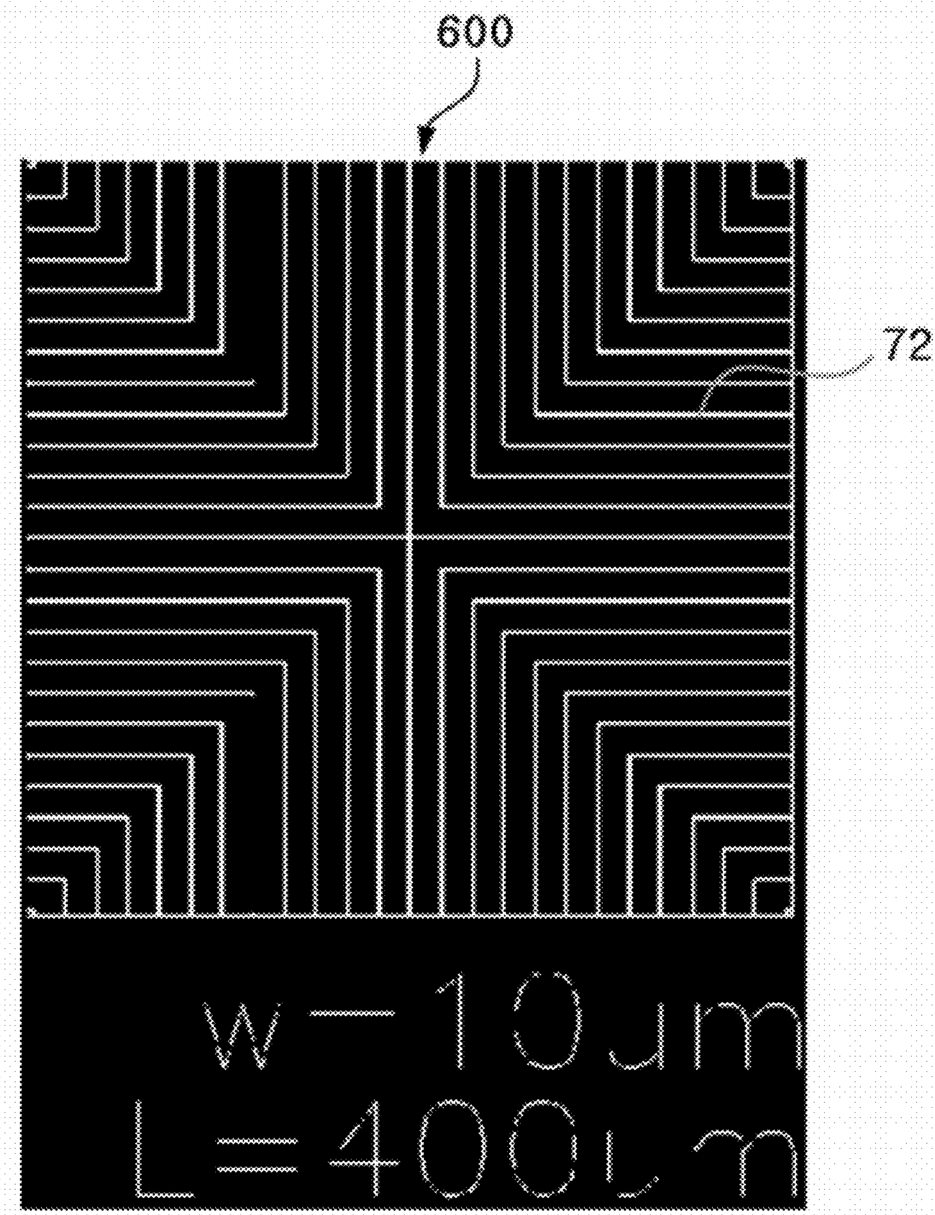

FIG. 3 shows enlarged photographs of a process for manufacturing a transparent electrode 100 by the manufacturing method of FIG. 1 and each process step. Referring to FIG. 3, disclosed is the transparent electrode 100, which is manufactured by (a) imprinting the concave grooves 11 of the pattern on a synthetic resin film, which is the transparent substrate 1, (b) forming the metal wire 2 by filling the metal paste 12 in the concave grooves 11, and (c) coating conductive polymer serving as the solution type transparent electrode 3 on the synthetic resin film.

The transparent electrode 100 of the first exemplary embodiment has a transmittance of 83.69% and an electrical resistance of 9.65 Ω/sq in a visible light region of 550 nm. The transparent electrode 100 of the first exemplary embodiment has two properties: high electrical conductivity with a surface resistance of less than $10^3$ Ω/sq; and a transmittance of more than 80% in a visible light region of 550 nm.

Table 1 shows the electrical resistance of transparent electrodes, in which the metal wire 2 is formed in a mesh and the line width W of the metal wire 2 and the interval L of the metal wire 2 are various.

TABLE 1

Electrical resistance of transparent electrodes having mesh-like metal wire

| Interval (L) | Electrical resistance versus line width (Ω/sq) | | | | |
|---|---|---|---|---|---|
| (μm) | 10 μm | 15 μm | 20 μm | 25 μm | 300 μm |
| 250 | 5.70 | 4.76 | 4.33 | 4.14 | 4.03 |
| 300 | 6.67 | 4.80 | 4.47 | 4.29 | 4.11 |
| 350 | 6.81 | 5.62 | 5.01 | 4.89 | 4.72 |
| 400 | 7.06 | 6.17 | 5.95 | 5.51 | 5.07 |
| 450 | 8.01 | 7.11 | 6.08 | 5.78 | 5.37 |
| 500 | 9.65 | 8.42 | 8.01 | 6.67 | 6.00 |

The transparent electrodes of Table 1 show greater line widths W than the line width W of 5 μm of the transparent electrode 100 of the first exemplary embodiment and smaller intervals L than the interval L of 250 μm thereof. Thus, a decrease in transmittance resulting from the line widths W can be supplemented by the intervals L, thus achieving a transmittance close to 83.69%. The transparent electrode 100 of the first exemplary embodiment and the transparent electrodes of Table 1 become higher in electrical resistance as their interval L becomes greater or their line width W becomes smaller; however, they have a much lower electrical resistance than ITO, whose electrical resistance is 20 Ω/sq.

In what follows, various exemplary embodiments of the present invention will be described. Explanations of operational effects identical or similar to those of the first exemplary embodiment will be omitted, and different operational effects and configurations will be described.

FIG. 4 to FIG. 8 show patterns of transparent electrodes 200, 300, 400, 500, and 600 according to second to sixth exemplary embodiments manufactured by manufacturing methods of the second to sixth exemplary embodiments of the present invention. Referring to FIG. 4 to FIG. 8, unlike the mesh type of the first exemplary embodiment, metal wires 22, 32, 42, 52, and 62 of the transparent electrodes 200 to 600 have circular, triangular, hexagonal, crosshatched, and crossed shapes, respectively.

Although no experimental data on line width and interval is disclosed, unlike the mesh type, it was found out that the transparent electrodes 200 to 600 having the metal wires 22, 32, 42, 52, and 62 of various patterns had transmittance and electrical resistance similar to those of the transparent electrode 100 of the first exemplary embodiment and the transparent electrodes disclosed in Table 1.

Table 2 shows the electrical resistance of the transparent electrodes 200 to 600 versus the shape of the metal wires 22, 32, 42, 52, and 62.

TABLE 2

Electrical resistance of transparent electrodes versus shape of metal wires

| Shape of metal wire | electrical resistance (Ω/sq) |
|---|---|
| circular | 4.96 |
| triangle | 4.03 |
| hexagonal | 6.95 |
| crosshatched | 14.30 |
| crossed | 13.58 |
| Mesh-like | 7.06 |

The transparent electrodes 200 to 600 of Table 2 have a much lower electrical resistance than ITO, whose electrical resistance is 20 Ω/sq. Also, the transparent electrodes 100 to 600 can adjust electrical resistance and transmittance by adjusting the pattern of the metal wires 2, 22, 32, 42, 52, and 62 and their line width and interval.

Figure 9:
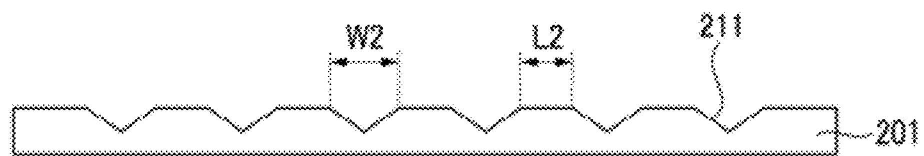
FIG. 9 is a cross sectional view of a transparent film imprinted during a manufacturing method according to a seventh exemplary embodiment of the present invention.
Figure 10:
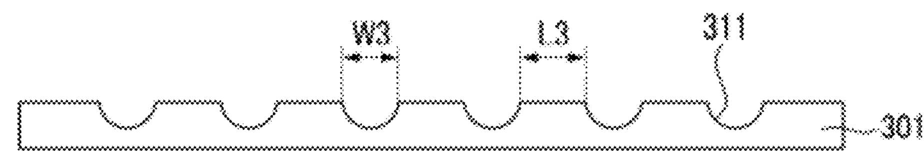
FIG. 10 is a cross-sectional view of a transparent film imprinted during a manufacturing method according to an eighth exemplary embodiment of the present invention.

FIG. 9 is a cross sectional view of a transparent film 201 imprinted during a manufacturing method according to a seventh exemplary embodiment of the present invention, and FIG. 10 is a cross-sectional view of a transparent film 301 imprinted during a manufacturing method according to an eighth exemplary embodiment of the present invention.

Referring to FIG. 9 and FIG. 10, unlike the concave grooves 11 of a rectangular pattern in the cross-sectional view of the first exemplary embodiment, triangular concave grooves 211 or arc-shaped concave grooves 311 are formed, keeping predetermined distances L2 or L3, from each other on a cross-section cut vertically through the transparent film 201 or 301.

When the maximum line width W2 or W3 of the triangular or arc-shaped concave grooves 211 or 311 is equal to the line width W of the rectangular concave grooves 11, the triangular or arc-shaped concave grooves 211 or 311 can decrease the space in which a metal paste is filled, as compared to the rectangular concave grooves 11.

Moreover, the rectangular, triangular, or arc-shaped concave grooves 11, 211, or 311 can increase or decrease the space of the metal paste, and this makes it possible to vary the transmittance and the electrical resistance.

If the space in which the metal paste is filled is equal in size, the maximum line width W2 or W3 of the triangular or arc-shaped concave grooves 211 or 311 is greater than the line width W of the rectangular concave grooves 11, thus enlarging the front openings.

Accordingly, if the distance L2 or L3 of the triangular or arc-shaped concave grooves 211 or 311 is equal to the distance of the rectangular concave grooves 11, the transparent film 201 of the triangular or arc-shaped concave grooves 211 or 311 has a higher transmittance than the transparent substrate 1 of the rectangular concave grooves 11. That is to say, the light interception amount of the triangular or arc-shaped concave grooves 211 or 311 is less than the light interception amount of the rectangular concave grooves 11.

The transparent electrodes 100 to 600 according to the first to sixth exemplary embodiments of FIGS. 1 to 8, FIG. 1 to FIG. 8 are illustrated with respect to the configuration in which the concave grooves 11 on the transparent substrate 1 are formed, the metal wires 2, 22, 32, 42, 52, and 62 are formed in the concave grooves 11, and the solution type transparent electrode 3 is coated on the transparent substrate 1.

Figure 11:
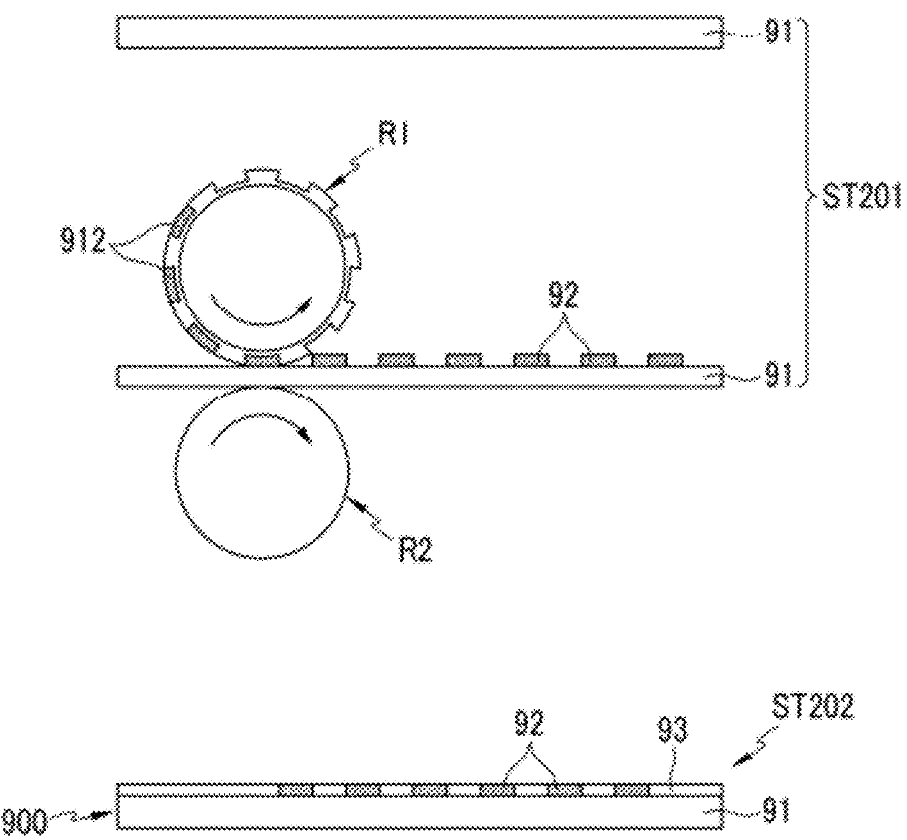
FIG. 11 is a sequential diagram of a method for manufacturing a transparent electrode 900 using a print-based metal wire according to a ninth exemplary embodiment of the present invention.

FIG. 11 is a sequential diagram of a method for manufacturing a transparent electrode 900 using a print-based metal wire according to a ninth exemplary embodiment of the present invention. Referring to FIG. 11, the transparent electrode 900 according to the ninth exemplary embodiment will be illustrated with respect to the configuration in which a metal wire 92 is printed to protrude from a transparent substrate 01, and a solution type transparent electrode 93 is coated on the transparent substrate 91.

In the first step ST201, the transparent substrate 91 is prepared, and the metal wire 92 is printed in a predetermined pattern on the transparent substrate 91. Accordingly, the transparent substrate 91 can be formed of glass or a synthetic resin film. That is, in the first step ST201, the metal wire 92 is formed on the transparent substrate 91 by patterning a metal paste 912 in a raised thin film by a pattern roll R3 and a sub roll R2. The printing method may include a gravure printing method, an offset printing method, an inkjet printing method, a micro contact printing method, a flexo printing method, and a screen printing method.

In the second step ST202, the solution type transparent electrode 93 is coated on the transparent substrate 91 by spin coating, slot die coating, ESD, spray, or micro gravure. At this point, the maximum height of the solution type transparent electrode 93 is consistent with the maximum height of the metal wire 92, so that one surface of the transparent substrate 91 is formed to be planar.

The transparent electrode 900 of the ninth exemplary embodiment shown in FIG. 11 allows the metal wire 92 to be formed in the same pattern as the metal wires 2, 22, 32, 42, 52, and 62 of the transparent electrodes 100 through 600 of the first to sixth exemplary embodiments.

While an exemplary embodiment of the present invention has been described, the present invention is not limited thereto and various modifications can be made within the claims, the detailed description of the invention, and the attached drawings, which are also included in the present invention.

What is claimed is:

1. A method for manufacturing a transparent electrode using a print-based metal wire, the method comprising:
- the first step of forming a metal wire in a pattern set for a transparent substrate; and
- the second step of coating a solution type transparent electrode on the transparent substrate,
- wherein, in the first step, the pattern is formed by using a synthetic resin film as the transparent substrate, and the first step comprises:
- the first sub-step of forming concave grooves of the pattern in the synthetic resin film; and
- the second sub-step of forming the metal wire by filling a metal paste in the concave grooves of the pattern, wherein, in the first sub-step, the concave grooves of the pattern is formed on the synthetic resin film by any one of the following: thermal roll imprinting, hot embossing, NIL, and thermal imprinting.

2. A method for manufacturing a transparent electrode using a print-based metal wire, the method comprising:
- the first step of forming a metal wire in a pattern set for a transparent substrate; and
- the second step of coating a solution type transparent electrode on the transparent substrate,
- wherein, in the first step, the pattern is formed by using a synthetic resin film as the transparent substrate, and the first step comprises:
- the first sub-step of forming concave grooves of the pattern in the synthetic resin film; and
- the second sub-step of forming the metal wire by filling a metal paste in the concave grooves of the pattern, wherein, in the second sub-step, the metal paste is filled in the concave grooves by any one of the following: doctor blading, self-assembly using surface energy, and electroforming.

3. A method for manufacturing a transparent electrode using a print-based metal wire, the method comprising:
- the first step of forming a metal wire in a pattern set for a transparent substrate; and
- the second step of coating a solution type transparent electrode on the transparent substrate,
- wherein, in the first step,
- the pattern is formed by using glass or a synthetic resin film as the transparent substrate, a raised thin film of metal paste having the pattern is formed on the transparent substrate and
- the raised thin film having the pattern is formed on the transparent substrate by any one of the following: a gravure printing method, an offset method, an inkjet method, a micro contact printing method, a flexo method, and a screen printing method.

4. The method of claim 3, wherein, in the coating the solution type transparent electrode, the solution type transparent electrode is coated on the transparent substrate by any one of the following: spin coating, slot die, ESD, spray, and micro gravure.

5. A transparent electrode manufactured by the manufacturing method of claim 3.

6. The transparent electrode of claim 5, wherein the metal wire is formed of any one of metals such as Ag, Cu, and Al used as an organic paste.

7. The transparent electrode of claim 5, wherein the solution type transparent electrode is formed of at least one of the following: conductive polymer, carbon nano tube (CNT), graphene, and solution type metal.

8. The transparent electrode of claim 5, wherein the metal wire is formed in any one of the following: circular, triangular, hexagonal, crosshatched, and crossed shapes.

9. The transparent electrode of claim 5, wherein the concave grooves having the pattern have a rectangular, triangular, or arc shape on a cross-section cut vertically through the transparent film.

10. The transparent electrode of claim 8, wherein the metal wire has a micro-scale line width and interval, and has a nano-scale line width and interval depending on a stamp molding technique.

* * * * *